United States Patent [19]

Dolby

[11] 3,756,329

[45] Sept. 4, 1973

[54] REEL-DEMOUNTABLE CASSETTE AND REELS FOR MAGNETIC TAPE

[75] Inventor: Dale P. Dolby, Los Altos, Calif.

[73] Assignee: Ampex Corporation, Redwood City, Calif.

[22] Filed: Apr. 7, 1972

[21] Appl. No.: 241,920

[52] U.S. Cl. ........... 179/100.2 Z, 242/197, 274/4 C
[51] Int. Cl. ........................................ G11b 23/04
[58] Field of Search ........................... 179/100.2 Z; 274/4 C, 4 B; 242/197–200, 55.19 A, 72.2; 24/221 A

[56] References Cited

UNITED STATES PATENTS

| | | | |
|---|---|---|---|
| 3,697,014 | 10/1972 | Lowry et al. | 242/197 |
| 3,677,497 | 7/1972 | Lowry et al. | 274/4 C |
| 3,692,956 | 9/1972 | Northrup | 179/100.2 Z |
| 3,495,787 | 2/1970 | Wallace | 179/100.2 Z |
| 3,083,925 | 4/1963 | Schoebel | 179/100.2 Z |
| 3,432,111 | 3/1969 | Ryder | 242/199 |
| 3,203,063 | 8/1965 | Vander Sande | 24/221 A |
| 2,907,418 | 10/1959 | Hudson et al. | 24/221 A |
| 2,571,641 | 10/1951 | Wing | 24/221 A |

*Primary Examiner*—Vincent P. Canney
*Assistant Examiner*—Alfred H. Eddleman
*Attorney*—Robert G. Clay

[57] ABSTRACT

A video tape cassette is arranged to break open in the middle, to release the reels, the two cassette halves pivoting on hinges the leaves of which are cast in durable plastic integrally with the cassette halves and are pinned together at the knuckles by means of a springy clip, making a tight-fitting hinge fastening. The cassette halves are held together remote from the hinges by key-type fasteners; and key-type inserts are also used for function lockout buttons. The reels have a simplified springloaded construction whereby both ends are urged into braking engagement with the cassette sides when the cassette is closed, to prevent unreeling of the tape.

13 Claims, 3 Drawing Figures

REEL-DEMOUNTABLE CASSETTE AND REELS FOR MAGNETIC TAPE

BACKGROUND OF THE INVENTION

This invention relates to magnetic tape transports, and particularly to a reel-demountable cassette and reels therefor.

Video tape cassettes are known in which two reels mount a short length of tape suitable for several minutes' play, a number of the cassettes being arranged in a carrousel or other supply magazine for programmed feeding to a tandem pair of transports, one transport unloading and reloading while the other plays, so that a continuous program may be presented.

In the prior apparatus, to change the reels or tape, a number of bolts must be time-consumingly unscrewed to break the two cassette halves apart, and the construction requires quite a large number of separately manufactured pieces, many of which must be machined from metal.

Accordingly, it is an object of the present invention to provide a cassette of simplified construction, comprising a minimum number of parts, substantially castable or moldable from durable plastic material, and rapidly operable for quick change of reels.

SUMMARY OF THE INVENTION

A video tape cassette is arranged to break open in the middle, to release the reels, the two cassette halves pivoting on hinges the leaves of which are cast in durable plastic integrally with the cassette halves and are pinned together at the knuckles by means of a springy clip, making a tight-fitting hinge fastening. The cassette halves are held together remote from the hinges by key-type fasteners; and key-type inserts are also used for function lockout buttons. The reels have a simplified springloaded construction whereby both ends are urged into braking engagement with the cassette sides when the cassette is closed, to prevent unreeling of the tape.

DESCRIPTION OF THE PREFERRED EMBODIMENTS

Figure 1:
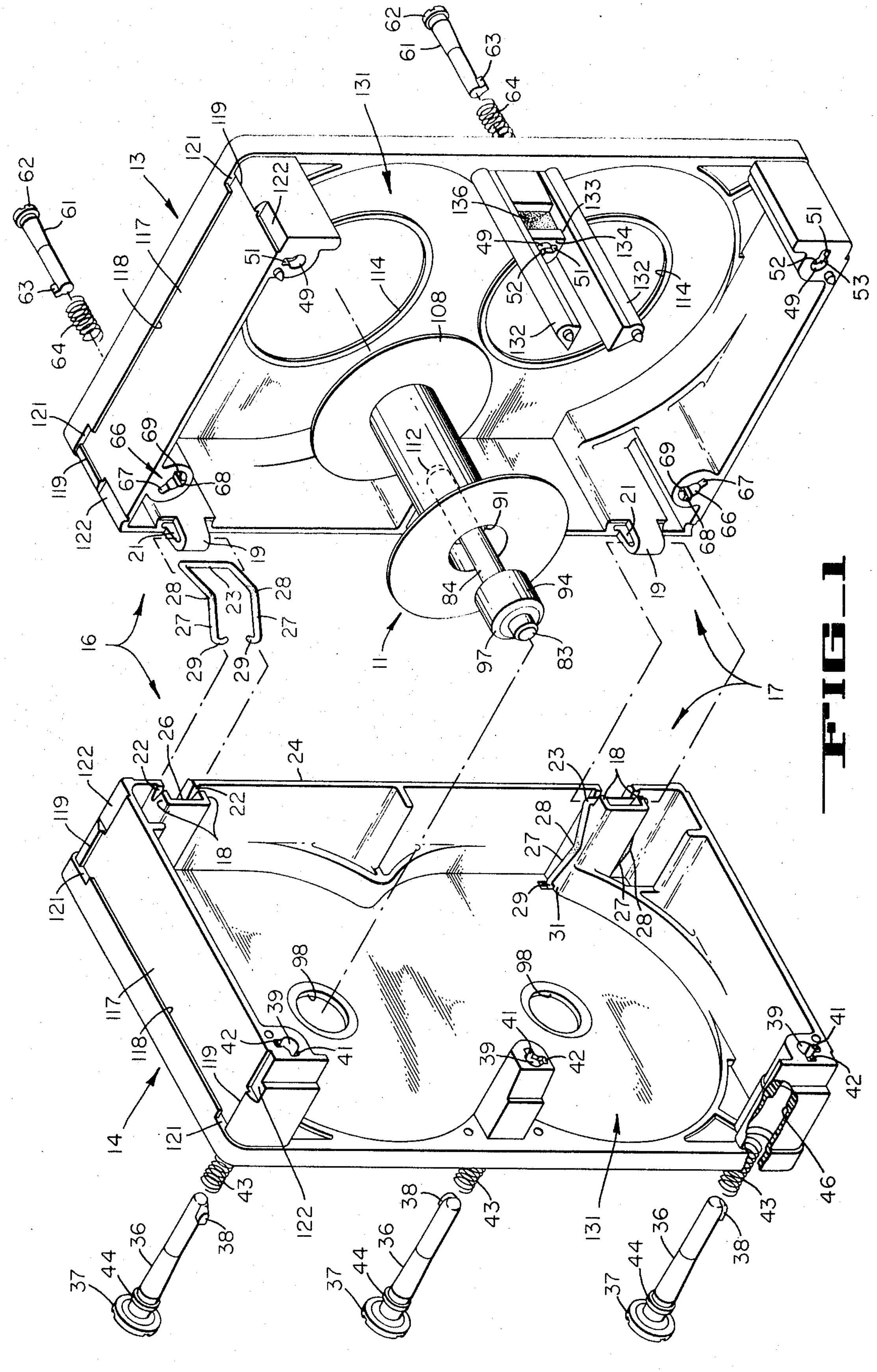
FIG. 1 is an exploded perspective view of a cassette and reel combination in accordance with the invention.

Referring to FIG. 1, there is shown one of a pair of reels 11, 12 (see also FIG. 2) suitable for winding a short length of magnetic tape (not shown) of the wide (e.g. 2 inches) video transverse recording type commonly used for "spot announcements" and "commercials" advertisements of several minutes' duration in television broadcasting stations. The reels 11,12 are normally enclosed in a cassette housing consisting of two substantially equal parts or halves 13,14, which may be broken open for removal or exchange of reel-mounted tape.

To facilitate the opening and closing of the cassette the halves are arranged with hinges 16,17 in each of which the leaves are integrally cast or molded as portions of the high-strength plastic housing halves 13,14, and the knuckles 18,19 define journal means 21,22 for a hinge pin 23.

To facilitate molding the cassettes from plastic, the hinges 16,17 have an unusual construction in that the first or female knuckle 18 is formed as part of a reentrant first wall 24 of the housing half 14 to define a recess 26 opening toward the exterior of the housing and toward the second or male knuckle 19 on half 13. This construction facilitates the production of the knuckle by casting or plastic molding techniques; and the male knuckle 19 is also moldable as a protrusion or extension of housing portion 13 to fit pivotably within recess 26 in both open and closed conditions of the cassette.

To facilitate both the manufacture and operation of the hinges 16,17, the reentrant wall 24 portion of knuckle 18 is slotted to define a pair of bearing slots 22 aligned on the hinge axis and opening toward the other housing portion 13, so as to permit lateral insertion and removal of the hinge pin 23. The pin 23 is formed with its mid-portion fitting in the slots 22, and two substantially parallel arms 27 extend orthogonally from the mid-portion and along the opposed faces 18 of the reentrant first wall portion that face inwardly of the housing. The arms 27 are curved or bent as at 28 and have hook portions 29 at the tips to define a springy clip. Thus, the clip 23, after having been inserted through the journal 21 of male knuckle 19, may be seated in slots 22 of female knuckle 18, and the tip hooks 29 are concurrently hooked, by a slight distortion of springy bent arms 27, around a pair of shoulders 31 (best seen in FIG. 2) that are cast in the walls 18 of the female knuckle. This structure not only facilitates manufacture and assembly of the hinge, but also its operation, for the springy clip 23 retains the two cassette halves in tightly clamped together and snug-fitting relation, both in the closed condition of the cassette and during the opening and closing process.

To hold the cassette halves together at points remote from the hinges, there are provided three key-type fasteners 36, each having an enlarged head 37 and a single bit 38. Each of the corresponding keyholes 39 (in part 14 e.g.) is warded to permit insertion and removal axial passage of the key only in a first predetermined orientation, i.e., the orientation illustrated in FIG. 1, which corresponds with a ward slot 41 that passes the entire length of keyhole 39 in part 14. However, once inserted, the key may be turned 90 degrees to a second orientation corresponding with a slot 42 which extends axially along the side of the keyhole only far enough to seat the axial length of bit 38. Thus, in the second orientation the key cannot be removed; and a helical compression spring 43 is provided to seat against a shoulder 44 forming part of the enlarged head portion of the key, and a shoulder 46 on the interior of the keyhole, to urge the key in a removal direction and thus retain it securely with the bit in slot 42.

To fasten the housing parts together by means of the keys 36, the other housing part 13 is provided with matching keyholes 49 that are warded to accept the key bit only in the second orientation thereof, as by means of a single ward slot 51, which passes to an enlarged interior chamber defined in part by a shoulder 52, having a shallow slot 53 therein at a different orientation than slot 51, so that when the key is pushed more deeply inwardly against the resistance of spring 43, it may be rotated to the orientation of slot 53 and seated therein, thus locking the two cassette halves together.

A key type structure is also used for function lockout buttons, such as record lockout and erase lockout, commonly provided in cassettes in the form of punch-out holes in the casing, the related function being permitted (or conversely, prevented) by a sensing lever on the transport engaging the punch-out before it is punched out, but being forbidden (or conversely, permitted) by the transport controls when the punch-out is missing, permitting the sensing lever to intrude into the punch-out recess. In the present invention, no punch-outs are provided, but rather a pair of depressable and restorable keys 61 having enlarged heads 62, single bits 63, and springs 64, fitting in keyholes 66 in a first orientation, as illustrated, corresponding to full-length slots 67, and being seatable in a second orientation in part-length slots 68 with the heads 62 coplanar with the outer surface of the cassette, representing the function-permitted position (or the opposite in some applications). Part-length slots 69 are also provided at a third orientation and at a depth such that when the key is further depressed and the bit is seated in slot 69, the head 62 is recessed substantially below the outer surface of the cassette, this being the function-forbidden position (or the reverse).

Both key heads 37 and 62 may be slotted to aid the use of screwdrivers in operation.

Figures 2, 3:
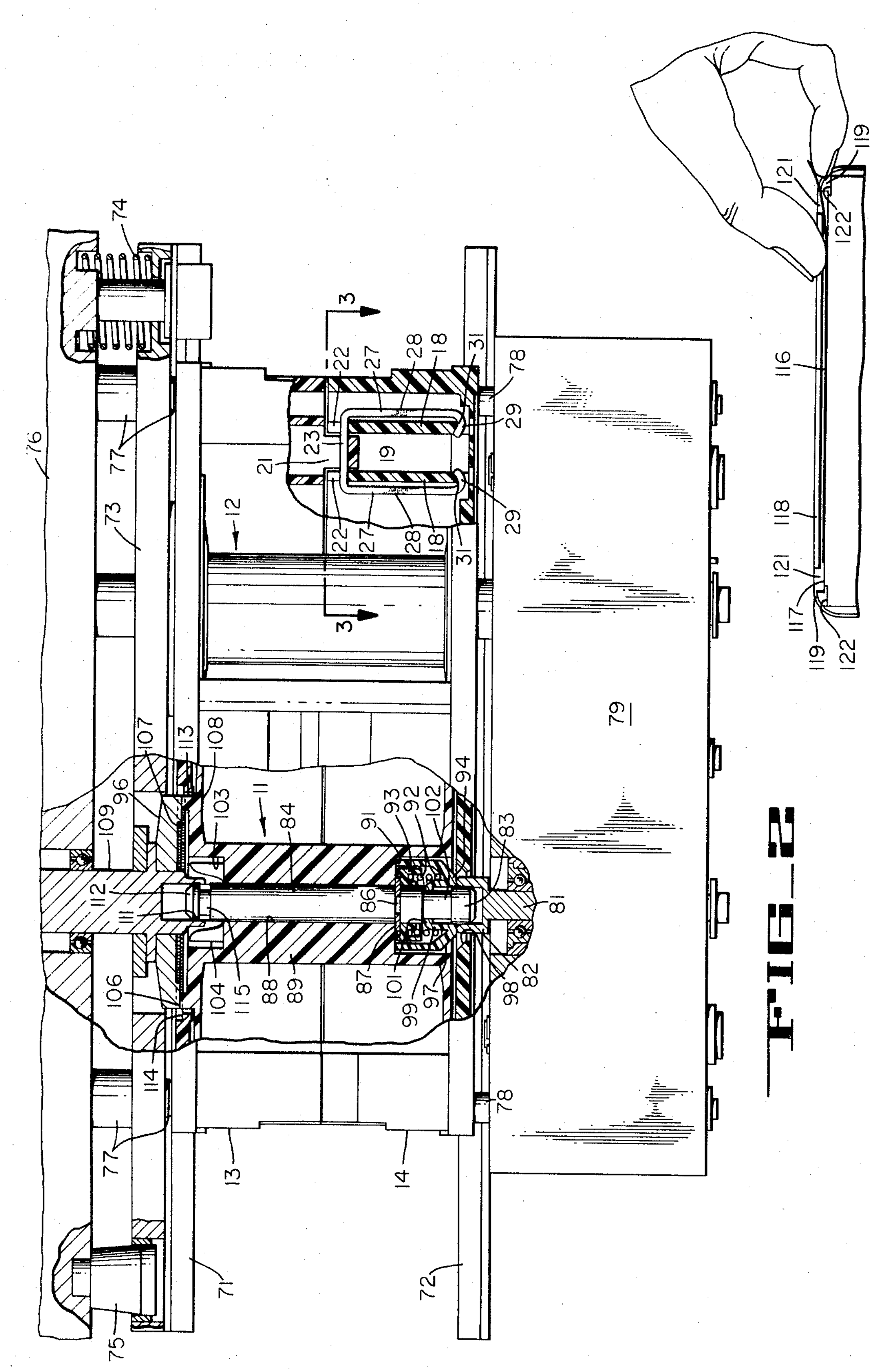
FIG. 2 is a broken away plan view, to an enlarged scale, of the combination of FIG. 1 in an operational environment.
FIG. 3 is a fragmentary cross sectional view taken on plane 3—3 of FIG. 2.

When the cassette is not in operation, the reels are arranged to brakingly engage the side walls of the cassette to prevent accidental unreeling of the tape, but the reels are disengaged from the cassette walls by the mechanism of the transport during operation. As shown in FIG. 2, the cassette 13,14 in operation rests in a set of tracks or rails 71,72, the rails 71 being carried on a plate 73 that is resiliently mounted as by springs 74 (only one of which is shown) and positioned by wedge pins 75 (only one of which is shown) so as to be adjustably spaced from a fixed portion 76 of the transport; and the rail 71 and plate 73 therefore yield when the cassette is laterally positioned against fixed pins 77 extending from the portion 76, as by pressure from movable positioning studs 78 extending from a fixed positioning apparatus 79.

The apparatus 79 contains mechanism (not shown) for axially extending a rotatable ball bearing mounted positioning rod 81 to the position illustrated, in which a sleeve portion 82 at the rod end engages and laterally positions one end 83 (see also FIG. 1) of a reel hub spindle 84. The spindle 84 has a circumferential groove 86 in which is mounted a spring clip washer 87; and the spindle thus fits loosely in an axial bore 88 of the reel hub 89, the bore 88 being enlarged at one end to define an outwardly facing shoulder 91 against which bears the washer 87. A helical compression spring 92, fitting in a bearing shoe 93, bears at one end through the shoe against the washer 87 and shoulder 91, and at the other end against a hollow brake member 94, so as to urge the hub 89 toward the wall of cassette part 13 and the brake member toward the wall of part 14. In the operational mode, the brake member 94 is held away from the adjacent cassette wall by the rim of the extended positioning sleeve 82, while the hub 89 is held away from the adjacent cassette wall by an extended rotatable drive member 96, so that the inward rim of brake member 94 bottoms directly against shoulder 91 of the reel hub, as shown in FIG. 2. When the members 96 and 82 are retracted, however, they are completely withdrawn from the cassette zone, and the chamfered (specifically shown here as bevelled) tip 97 brakingly engages a conformingly chamfered (specifically shown here as bevelled) opening 98 in the cassette wall, providing lateral positioning for the reel as well. To retain the brake member 94 on the spindle 84 through its range of axial movement, the member 94 is provided with a number of reentrant springy retaining fingers 99, hooked at the ends thereof as at 101, to fit within a circumferential recess 102 of the spindle.

The other end of the hub 89 also has a recess 103 in which are cast or molded a number of teeth or serrations 104 to adapt the hub for use with another transport of different design than the one here shown. The drive member 96 includes a frictional pad portion 106 to engage a serrated circular ridge 107 on the reel hub flange 108; and the member 96 is mounted on a drive shaft 109, the tip of which is hollowed to define a sleeve portion 111 fitting around the end 112 of spindle 84 for laterally positioning the spindle during operation. When the shaft 109 is retracted, the reel is braked and laterally positioned by engagement of a chamfered portion 113 thereof with a conformingly shaped opening 114 in the cassette wall.

A circumferential groove 115 is also provided on spindle 84 to accommodate slight misalignment of the spindle during extension of the shaft 109.

As a further feature of advantage, there is provided at the cassette end a retaining means for an identifying card such as an embossed card 116 (FIG. 3) of the credit-card type commonly shipped with cassettes of the present type for the convenience of broadcasting station personnel. The retaining means comprises a flat card bed 117 (see also FIG. 1) on one side of the housing, a pair of opposed retaining flanges 118 extending from the bed and overlapping the long edges of the card 116 for retaining the card slidably on the bed, and a pair of raised end frames 119 extending from the bed at the ends of the card, the frames 119 being spaced from the flanges 118 for a space 121 to enable the end of the card to be bent as shown in FIG. 3 for insertion or extraction. Also provided are a pair of cut-away fingertip recesses 122 in the bed and frames 119.

In operation, it is customary to mount tape on both reels with a reel-to-reel run of the tape extending therebetween, this run being exposed to the threading mechanisms of the transport through one substantially open side 131 of the housing. The tape run is preferably stabilized and precisely positioned for threading, despite variations in the amounts of tape that are wound on the respective reels, by means of a pair of guide posts 132 extending integrally from the housing half 13 for the full width of the tape, so as to avoid having a joint in the middle, which might score or damage the tape.

For use in a vacuum threading type of transport, in which the reel-to-reel run of tape across the guide posts 132 is sucked into the transport before recording or playing begins, it is of importance to arrange the tape in the cassette so that the back side of the reel-to-reel tape run is directly exposed to atmospheric air pressure, whereby the vacuum differential or suction threading force is maximum and fully effective. Accordingly, two posts 132 are used, rather than one, and the two posts are spaced laterally apart as shown to define an atmospheric air access passage 133 therebetween. This passage is further defined by the portion 134 in which the central keyhole 49 is formed. This portion 134 extends integrally from the side of housing half 13 and from the posts 132, but has an opening 136 leading through the side of the housing half 13 to atmosphere.

Thus there has been described a video tape cassette arranged to break open in the middle, to release the reels, the two cassette halves pivoting on hinges the leaves of which are cast in durable plastic integrally with the cassette halves and are pinned together at the knuckles by means of a springy clip, making a tight-fitting hinge fastening. The cassette halves are held together remote from the hinges by key-type fasteners; and key-type inserts are also used for function lockout buttons. The reels have a simplified springloaded construction whereby both ends are urged into braking engagement with the cassette sides when the cassette is closed, to prevent unreeling of the tape.

I claim:

1. A reel-demountable cassette and reels for magnetic tape, comprising:

- a generally rectangular housing arranged for holding said reels with the reel axes in spaced parallel relation to one another and within a plane that extends parallel to and between a pair of spaced parallel first walls of said housing, the other walls of the housing being arranged in planes orthogonal thereto;
- said housing being formed in two parts for mutual opening movements away from one another in a general direction parallel to said reel axes;
- hinge means for coupling said two housing parts together in the plane of one of said first walls thereof;
- said hinge means comprising a hinge pin; and
- a pair of knuckle portions formed on said respective housing parts and interfitting to define journal means for said hinge pin;
- a first one of said knuckle portions being relieved to permit lateral insertion and removal of said hinge pins;
- means for removably securing said hinge pin in said first knuckle portion; and
- fastening means for coupling said two housing parts together at places remote from said one first wall of said housing.

2. A cassette and reel combination as described in claim 1, wherein:

- said one first wall at said first knuckle portion is reentrant to define a recess opening toward the second knuckle portion and the exterior of said housing;
- said second knuckle portion being formed to extend from the other housing portion and to fit pivotably within said recess, in both open and closed conditions of said cassette.

3. A cassette and reel combination as described in claim 2, wherein:

- said reentrant wall is slotted to define a pair of bearing slots aligned on the hinge axis and opening toward said other housing portion.

4. A cassette and reel combination as described in claim 3, wherein:

- said hinge pin is formed with a midportion fitting in said slots, and two parallel arms extending orthogonally from said midportion and along the opposed reentrant wall faces that face inwardly of said housing.

5. A cassette and reel combination as described in claim 4, wherein said arms are curved and have hook portions at the tips thereof to define a springy clip;

- said corresponding housing portion having a pair of shoulders formed therein for receiving and securing said hook tips of said clip in springy detachable fashion;
- said combination being dimensioned so that said spring clip urges said housing parts tightly together in the closed position of said cassette.

6. A cassette and reel combination as described in claim 1, wherein each of said fasteners comprises;

- a key having a single bit and an enlarged head;
- one of said housing parts being formed with a keyhole for said key, said keyhole being warded to permit insertion and removal axial passage of said key only in a first predetermined orientation, but retention of said key by said bit thereof in a second predetermined orientation;
- spring means in said keyhole for urging said key in a removal direction; and
- the other of said housing parts being provided with a matching keyhole for said key, said matching keyhole being warded to permit passage of said key only in said second orientation, and retention of said key by said bit thereof in another orientation;
- whereupon said housing parts are fastened together as by opposed engagement said said key bit and said enlarged head of said key, respectively.

7. A cassette and reel combination as described in claim 1, wherein function lockout buttons are also provided, each comprising:

- a function lockout key having a single bit and an enlarged head;
- one of said housing parts being formed with a lockout keyhole for said lockout key, said lockout keyhole being warded to permit insertion and removal axial passage of said lockout key only in a first predetermined orientation thereof, but retention of said lockout key by said bit thereof in a second predetermined orientation thereof with said head coplanar with the outer surface of said one housing part;
- said lockout keyhole being further warded to permit deeper penetration of said lockout key only in said second orientation thereof and retention of said lockout key by said bit thereof in a third orientation with said head substantially recessed below the plane of said outer surface of said one housing part; and
- spring means in said lockout keyhole for urging said lockout key in a removal direction thereof.

8. A cassette and reel combination as described in claim 1, wherein each of said reels comprises:

- a hub having an axial bore enlarged at one end to define an outwardly facing shoulder;
- a spindle in said bore and a spring collar fitting in a circumferential groove on said spindle and engaging said hub shoulder to limit the insertion of said spindle in said bore;
- a brake member fitting for axial sliding motion on said spindle and for frictional bearing against the adjacent wall of said housing in an extended position of said brake member; and
- compression spring means between said brake member and said collar and shoulder to urge said brake member into said extended position and concurrently to urge the other end of said reel hub frictionally against the confronting wall of said housing for frictionally locking said hub against rotation in the extended position of said brake member.

9. A cassette and reel combination as described in claim 8, wherein said brake member is provided with a number of reentrant springy retaining fingers hooked at the ends thereof to fit within a circumferential recess of said spindle for limiting axial movement of said brake member between a position beyond said extended braking position and a retracted non-braking position closer to said shoulder.

10. A cassette and reel combination as described in claim 9, wherein the axial end portions of said brake member and the reel flange remote therefrom are chamfered to mate with correspondingly shaped openings in said housing walls, so as to provide lateral positioning for said reel as well as braking action in the extended position of said brake member.

11. A cassette and reel combination as described in claim 1, wherein there is also provided a card retaining means comprising:

a flat card bed on one side of said housing, said bed being shaped to the shape of said card;

a pair of opposed retaining flanges extending from said bed and overlapping the long edges of said card for retaining said card slidably in the direction of the longer axis thereof;

a pair of raised end frames extending from said bed at the ends of said card for restricting said sliding motion of said card in flattened position on said bed;

said edge retaining flanges being spaced from said raised end frames to enable sliding insertion and extraction of said card as by bending the end thereof away from said bed to clear the adjacent raised end frame of said bed; and said bed and raised end frames being cut away to form a pair of fingertip insertion recesses, enabling the insertion of a fingertip between said card and bed to aid in grasping said card for removing same.

12. A cassette and reel combination as described in claim 1, wherein:

said two housing parts each have substantially the same dimension in the direction parallel to said reel axes, so as to form substantially equal halves of said housing;

the side of said housing corresponding to the reel-to-reel run of said magnetic tape being substantially open to expose said tape run, and being provided with at least one guide post inwardly of said tape at the middle of said run;

each of said guide posts extending integrally from one of said housing parts for the full width of said tape.

13. A cassette and reel combination as described in claim 12, wherein:

two of said guide posts are provided in laterally spaced apart relation to define an atmospheric air access passage therebetween;

at least one side of said housing having an opening formed therethrough at a position between said guide posts, so as to provide for direct communication of atmospheric air pressure to the back side of said reel-to-reel tape run.

* * * * *